3,278,567
PROCESS FOR CONJUGATING AND ISOMERIZ-
ING DRYING OILS AND PRODUCTS
Walter E. Rathjen, Lafayette, Lowell O. Cummings, San Anselmo, and John A. Kneeland, Kentfield, Calif., assignors to Pacific Vegetable Oil Corporation, San Francisco, Calif., a corporation of California
No Drawing. Filed Jan. 19, 1965, Ser. No. 426,677
23 Claims. (Cl. 260—405.6)

This application is a continuation-in-part of application Serial No. 196,919, filed May 23, 1962, now abandoned.

This invention relates to improving the qualities of unsaturated drying oils, providing both an improved method of treatment and a novel and outstanding product.

The starting material on which this invention works is unsaturated drying oils having cis-type non-conjugated unsaturation, especially but not exclusively polymerizable triglyceride oils. Safflower, soybean, linseed, walnut and fish oils are typical examples. After treatment according to this invention, the oils have a high diene conjugation and a very high percentage of trans isomers; these treated oils give superior products when copolymerized with reactive vinyl monomers and can also be used to produce excellent alkyds, enamels, and house paints. The treated oils have an unusually light color, which enhances their value in pigmented paints, the treated safflower oil product being particularly outstanding and producing an unusually white paint when white pigments are incorporated into an oil-modified alkyd enamel or paint employing safflower oil treated according to this invention.

It is known that unsaturated drying oils can be treated with anthraquinone to produce conjugation, but many products of the present invention are different and have qualities superior to those resulting from anthraquinone treatment.

The invention provides a novel treatment employing sulfur dioxide. Heretofore, treatment of such oils with sulfur dioxide (see U.S. Patent 2,188,273 and British Patents 480,677, 544,482, and 650,159), has involved either the use of pressures substantially greater than atmospheric or temperatures above 550° F. The result has been conjugation but little, if any, trans-isomerization.

In contrast, the present invention employs treatment with sulfur dioxide at atmospheric pressure and at temperatures below 550° F., preferably in the range of 475–550° F. This combination of treating conditions produces an unusual combination of product qualities, namely, high (e.g., 5% to 20%) diene conjugation and very high (e.g., 25% to 55%) trans-isomerization, and these qualities give important advantages over the treatment products heretofore known. For example, unlike British Patent 544,482, our treatment not only produces a high conjugation but also produces a near-maximum amount of isolated trans bonds, which renders the oils more suitable for producing alkyds and similar products.

The invention is also unusual in that, after the sulfur dioxide treatment at atmospheric pressure and at 475° F. to 550° F., we find that treatment with carbon dioxide (replacing the sulfur dioxide) results in bleaching the already light oil, giving it an unusually light color, especially with safflower oil. Heretofore, carbon dioxide has been looked on only as an "inert" gas like nitrogen or argon for effecting the removal of sulfur dioxide, whose presence after treatment has been known as causing conjugated oil to darken. We have found that, rather than being "inert," carbon dioxide—in our process—bleaches the oil, while nitrogen does not.

In addition, we have found that the sulfur dioxide should all be removed before the temperature of the oil drops below 400° F., for below that temperature, sulfur dioxide or its derived products produces an immediate darkening of the oil, carbon dioxide treatment being continued below 400° F. as a protective inert atmosphere, though other inert gases may be used after removal of the sulfur dioxide.

Furthermore, we have found that the carbon dioxide treatment should be continued until negative results are obtained on a starch iodate test. Such a test may employ filter paper dipped in a solution of 1% starch and 1% potassium iodate. This moist paper turns blue when subjected to sulfur dioxide fumes. When carbon dioxide treatment is carried sufficiently far, the vapors above the hot oil will no longer turn this paper blue, and then the oil needs no further treatment with carbon dioxide.

Still further, we have found that after both the sulfur dioxide and carbon dioxide treatments of this invention the oil tends to deteriorate with storage (though it is quite satisfactory if used within a few weeks after treatment), apparently because of residual sulfones or sulfolenes tending to decompose and liberate sulfur dioxide. These impurities tend to poison alcoholysis catalyst and also tend to affect the air-drying properties of the oil. We have found that treatment with an alkaline material that is not soluble in the oil or with filtering clays removes the traces of residual materials enough to lengthen the time for which the product can be stored without deterioration.

The following examples will help the reader to understand the invention.

Example 1

1200 grams of non-break safflower oil having no appreciable conjugation and no appreciable trans isomerization were heated in a two-liter, three-neck flask with a thermometer, a stainless steel stirrer, and a fritted glass gas inlet tube. The oil was heated to 475° F. and then treated at atmospheric pressure by bubbling one pound of sulfur dioxide through it during an interval of seven hours, to complete the conjugation reaction. Then the sulfur dioxide was turned off and a stream of carbon dioxide was blown through the oil as it cooled down to about 300° F. From time to time, samples were withdrawn and a piece of the above described starch iodate test paper was suspended in the air space above the oil. When the absence of the blue color was observed, then the carbon dioxide treatment was stopped. The resultant product was found to have the following properties:

| | |
|---|---|
| Diene conjugation _____percent__ | 19.5 |
| Isolated trans isomerization _____do____ | 54 |
| Acid value _____ | 2.0 |
| Viscosity, Gardner-Holt _____ | G1/2 |
| Color, Gardner _____ | 1+ |

The diene conjugation was determined by a spectrophotometric method, AOCS official method Ka 13–56. The isolated trans double bond characteristics of the oil in this example and in all instances referred to in this application were revealed by infra-red analysis and by low temperature crystallization studies. Infra-red analysis (see Chipault and Hawkins, J. Am. Oil Chemicals Society, vol. 36, page 539, 1959 and Shreve et al., Anal. Chem., vol. 22, page 1261, 1950) indicated 54% isolated trans isomers in the case of the safflower oil of this example, while similar analysis of similar safflower oil using anthraquinone as the conjugation catalyst gave only 9% isolated trans isomers.

Example 2

3 pounds of non-break safflower oil like that of Example 1 were heated in a stainless steel reactor kettle equipped with a turbine stirrer, a thermometer, and a gas inlet tube, under atmosphere of carbon dioxide. At 490° F. sulfur dioxide was introduced through the gas inlet tube at a rate of 0.375 pound per hour at atmospheric pressure.

3,278,567

The reactor temperature was held in the range of 490° F. to 535° F. for two hours until a G1/3 Gardner-Holt viscosity was produced with a 3+ color. Then the sulfur dioxide was shut off, and carbon dioxide was blown through the oil for one hour during the cooling-down process. The color of the finished product was 1 Gardner. The conjugation and trans isomerization was substantially as in Example 1.

*Example 3*

7 pounds of non-break safflower oil were heated at 500° F. in a nitrogen atmosphere in a five-liter kettle equipped with accessories. Then the nitrogen was replaced with sulfur dioxide at atmospheric pressure at 0.375 pound per hour. At the end of four hours the product had a G viscosity and a 3+ color. Replacement of the sulfur dioxide by nitrogen during cooling, using the nitrogen treatment according to the prior art resulted in a treated oil with a 3+ color. Thus, this example in comparison with Example 2, shows the value of the carbon dioxide bleach.

*Example 4*

2000 grams of alkali treated walnut oil were heated in a three-liter, four-neck flask at 550° F. at atmospheric pressure with 0.321 pound of sulfur dioxide per hour. Care was taken to be sure that the temperature did not exceed 550° F. At the end of 3½ hours the product had a 5-color and a Z2½ viscosity. Carbon dioxide treatment for 45 minutes till the temperature dropped to 290° F. resulted in a product with a 3+ color.

*Example 5*

Several oils were treated substantially as in Example 4. The results were tabulated as follows:

| Oil | Viscosity (Gardner-Holt) | Percent Conjugation (UV) | Color, Gardner |
|---|---|---|---|
| Soybean Oil | G ½ | 14.6 | 2½ |
| Linseed Oil | G ½ | 11.7 | 4½ |
| Walnut Oil | G ½ | 16.9 | 3− |
| Safflower Oil | G ½ | 19.5 | 1 |
| Linseed Oil | Z 3 | 10.6 | 6½ |
| Walnut Oil | Z 3 | 13.5 | 3− |
| Soya/Linseed 60/40 | Z 3 | 8.5 | 6 |
| Safflower Oil | Z 3 | 17.7 | 3 |

In addition various fish oils, including sardine oil, have been treated by this process, using the procedure for Example 4. Comparable results in viscosity and conjugation were obtained, but the color was somewhat darker.

*Example 6*

The product resulting from the process of this invention was compared with two other products which might be thought to be similar: (1) dehydrated castor oil and (2) safflower oil that was conjugated by the anthraquinone process. The oil of this invention was safflower oil treated according to Example 2 above. Infra-red analysis was used for determining the extent and type of trans isomerization. The results are tabulated as follows:

| | Dehydrated Castor Oil | Anthraquinone Conjugated Safflower | Oil of Example 2 |
|---|---|---|---|
| Conjugated cis-trans unsaturation (as methyl octadecadienoate), percent | 10 | 4.9 | 4.4 |
| Conjugated trans-trans unsaturation (as methyl octadecadienoate), percent | 3.5 | 13.00 | 10.1 |
| Isolated trans unsaturation (as methyl elaidate), percent | 21 | 9 | 54 |

*Example 7*

We have found that superior properties can be obtained by subjecting the oil after treatment with sulfur dioxide (such as either Example 2 or Example 3) with a suitable filter-type clay or alkaline oil-insoluble powder.

To give some indication of what can be done, the treatment with three different types of clay and one alkaline silicate will be described. Of these:

"Clay No. 1" is an acid-activated bleaching clay produced from domestic sub-bentonite.

"Clay No. 2" is an acid-activated bleaching clay produced from bentonites.

"Clay No. 3" is a non-activated natural clay produced from domestic sub-bentonite.

The alkaline silicate is a synthetic magnesium silicate absorbent having a ratio of magnesium oxide to silica of 2:5.

The chemical composition of these clays may be tabulated as follows:

| | Clay #1 | Clay #2 | Clay #3 | Silicate |
|---|---|---|---|---|
| Chemical Composition of the Clays: | | | | |
| $SiO_2$ | 75.5 | 71.2 | 65.0 | 75.0 |
| $Al_2O_3$ | 12.0 | 16.5 | 19.7 | |
| $Fe_2O_3$ | 1.9 | 3.6 | 3.9 | |
| MgO | 2.0 | 3.2 | 1.6 | 25.0 |
| CaO | 1.8 | 2.6 | 1.7 | |
| $SO_3$ | 0.5 | 1.3 | | |
| $K_2O$ plus $Na_2O$ | 1.2 | 1.0 | 3.0 | |
| $TiO_2$ | | 0.6 | | |
| Loss on ignition | 5.6 | | 5.6 | |
| Physical Properties of the Clays: | | | | |
| Moisture, percent | 17.0 | 15.0 | 10.0 | 10.0 |
| pH | 3.4 | 4.0 | 6.1–6.5 | 8.5–9.5 |
| Bulk Density, lb./ft.³ | 55 | 45 | 64 | 13–17 |
| Particle Size (screen), percent: | | | | |
| Thru 200 mesh | 93.0 | 94 | 95.0 | |
| Thru 325 mesh | 75.0 | 75.0 | 85.0 | 100 |

All of these materials gave substantial improvement in the color, color stability, and the air dry of the oils.

As to color improvement, the materials can be used to lighten the color of the oil of Example 3 and of similar oils which have not received the carbon dioxide treatment. Thus, safflower oil which had been treated according to Example 3 was further treated with "Clay No. 2" in separate treatments, some with and some without activated charcoal, the clay being used at the rate of 3% the weight of the oil, with charcoal, when used, at the rate of one-tenth of the amount of clay used. In all instances, the treatment was at 110° C. (230° F.) and included mixing with the clay or silicate and then removal of the clay or silicate from the oil. Before treatment, the oil had a color of 3+ Gardner, but after treatment with the clay, it had a lighter color of 1 Gardner. In still other instances, safflower oil from a treatment similar to that of Example 3, some having an initial color of 3 and some having an initial color of 3½ was treated, some with Clay #1 and some with Clay #3, all at 110° C., and gave a color less than 1 Gardner.

Color stability has been improved by treatment with the clay. For example, safflower oil which had been treated by carbon dioxide so that it had a color of 2+ but which was not thereafter treated with clay, had deteriorated within one week to a color of 4− and in six weeks to a color of 6+, all Gardner. When the same oil had received treatment with clay, it had a slightly lighter original color of 2−; after one week the color had risen only to 2 and in six weeks only to 2+, showing a substantial improvement in color stability.

The improvement in air drying can also be noticed when safflower oil prepared according to Example 1, 2, or 3 of the specification is further treated with the materials above noted or with lime, another alkaline powder which has been found to give good results. In certain tests the dry time data were obtained from a mixture of the oil with three drier materials: a mixture of 63 grams of 24% lead octoate, 25 grams of 6% cobalt octoate, and 12.5 grams of 6% manganese octoate, diluted to 500 cc. in xylene, 0.1 cc. of the solution being added to each gram of oil. Thus, to 50 grams of the oil prepared as shown in the tabulation below, 5 cc. of drier solution was added, and the oil and the drier were then allowed to stand overnight. The following morning the oils were drawn down on glass with a 3-mil clearance blade, giving approximately 1.5 mil of wet film. The following dry times were observed:

| Oil | Treatment | Dry Time (Hours) | |
|---|---|---|---|
| | | Initial | Through |
| Oil of Example 3 | None | 4 | 7 |
| | 2% Lime | 3 | 5 |
| | 3% Clay #1 | 3½ | 4½ |
| Oil of Example 2 | None | 3½ | 7-8 |
| | 2% Magnesium silicate | 2¼ | 4 |
| | 2% Clay #1 | 2 | 5 |

Example 8

Treated oils of this invention react with glycerol (or other polyalcohols) and phthalic anhydride (or other dibasic organic acids) to produce alkyds. Treated safflower oil of this invention produces, in such a reaction, an alkyd with a Gardner color of 2+, which is the lightest colored drying oil alkyd known to us. Moreover, it contains no linolenic acid isomers, undesirable components of other oils that tend to cause yellowing of the enamel under both air-dry and baking conditions. The hardness of such enamels was found to compare favorably with alkyds made from dehydrated castor oil and anthraquinone-treated safflower oil.

Example 9

A series of 36% oil-length benzoic-acid-modified conjugated oil alkyds (see Example 12) were made for comparisons of acid values, color, and viscosity. The alkyds were all above 50% solids content. The results are tabulated as follows:

| Oil | Acid value | Color, Gardner | Viscosity, Gardner-Holt |
|---|---|---|---|
| Anthraquinone-conjugated safflower oil, G body | 3.1 | 5 | T+¾. |
| Safflower oil, G body, 2% Clay #1 | 3.9 | 2+ | S. |
| Dehydrated castor oil, G body | 4.8 | 4− | U. |

Example 10

A series of 43% oil-length straight phthalic anhydride-glycerol alkyds (see Example 12) were made, each 50% solids, and compared as follows:

| Oil | Acid value | Color, Gardner | Viscosity, Gardner-Holt |
|---|---|---|---|
| Anthraquinone-conjugated safflower oil | 3.4 | 5-6 | S. |
| Safflower oil, G body, 2% Clay #1 | 3.2 | 3 | M. |
| Dehydrated castor oil | 3.6 | 4+ | U+. |
| Safflower oil of Example 7 | 1.4 | 2+ | M+. |

Example 11

Two 55% oil length alkyds (50% solids), made (see Example 12) from conjugated safflower oils in which the total oil content was conjugated oils, had the following contrasting properties:

| Oil | Acid value | Color, Gardner | Viscosity, Gardner-Holt |
|---|---|---|---|
| Anthraquinone-conjugated safflower oil | 5.3 | 5½ | $Z_4$. |
| Safflower oil of Example 2 | 3.7 | 2+ | $Z_5$+⅞. |

Example 12

The G-viscosity treated safflower oil of this invention is particularly useful in alkyds, where it makes remarkable light colored, non-yellowing, quick drying, hard films. The short and medium length resins are especially suited for baking and fast air dry applications. Longer alkyds combining tall oil fatty acids for low cost with this oil for very fast dry and good color are excellent.

Three typical formulations follow. It may be noted that the 55% alkyd given below makes an excellent base for reaction with styrene, vinyl toluene, methyl methacrylate, and the like.

| Ingredients and Properties | Values and Parts by Weight | | |
|---|---|---|---|
| Oil length | 36% | 43% | 55%. |
| Type | Baking | Baking | Air dry or baking. |
| Safflower oil of Example 2, G-viscosity | 605 parts | 738 parts | 924 parts. |
| Synthetic glycerol, 99% | 412 | 384 | 290. |
| Calcium hydroxide | 0.2 | 0.25 | 0.25. |
| Pthalic anhydride | 683 | 678 | 585. |
| Triphenyl phosphite | 2.4 | 3.0 | 3.0. |
| Benzoic acid | 101 | | |
| Xylene for reflux | 90 | 90 | 90. |
| Cooking temperature | 430° F | 430° F | 440° F. |
| Cooking time | About 4 hours | 2-3 hours | 4-5 hours. |
| Percent non-volatile | 50 | 50 | 50. |
| Solvent | Xylene type | Xylene type | Mineral spirits. |
| Viscosity, Gardner-Holt | S-T | M-P | $Z_2$-$Z_4$. |
| Color, Gardner | 2 to 4 | 2 to 4 | 2 to 4. |
| Acid number of solution | 3-4 | 3-4 | 3-5. |
| Dry, 1.5 mil film | | | ¾ hr. initial dry. |
| (0.3% Pb, 0.03% Co, 0.015% Mn) | | | 15 hrs. through dry. |

Example 13

An inexpensive, fast drying, light colored alkyd was formulated from tall oil fatty acids and the improved safflower oil product of Example 2, G-viscosity.

Ingredient: Parts by weight
- Safflower oil, G-viscosity _____ 484
- Pentaerythritol, Technical _____ 339
- Calcium Hydroxide _____ 0.2
- Phthalic Anhydride _____ 461
- Triphenyl phosphite _____ 2.4
- Tall oil fatty acids, low rosin _____ 716
- Xylene for reflux _____ 80

Qualities: Values
- Oil length (as glycerides) _____ 65%.
- Cooking temperature _____ 460° F.
- Cooking time _____ 4-6 hours.
- Solvent _____ Mineral spirits.
- Percent non-volatile _____ 60%.
- Viscosity, Gardner-Holt _____ U-W.
- Color Gardner _____ 4 to 5.
- Acid value of solution _____ 5-6.
- Percent phthalic anhydride _____ 24.2%.
- Dry time—1.5 mil film _____ ¾ hr. initial dry.
- (0.3% Pb, 0.03% Co, 0.015% Mn) _____ 8-9 hrs. through dry.

Example 14

The new tested safflower oil of Z-3 viscosity is especially suited for blending with rosin ester solutions to make enamels with fast initial dry, fast and hard through-dry, and unusually light, non-yellowing color. As the oil of this invention is non-yellowing, the rosin ester is the only portion of the vehicle which will contribute yellowing, making possible enamels with substantially less yellowing.

The formulation below shows a one-coat type enamel with easy brushing and non-sagging qualities.

| Ingredient: | Parts by weight, pounds |
|---|---|
| Treated safflower oil of Example 5, Z-3 viscosity | 200 |
| Glycerine ester of rosin | 60 |
| Titanium oxide | 625 |
| Zinc oxide | 10 |
| 5% calcium naphthenate | 5 |
| Bodied safflower oil, Z-7 viscosity | 5 |
| Grind on a three roll mill and let down. Then add: Glycerine ester of rosin | 140 |
| Mineral spirits | 165 |
| Zirconium octoate, 6% Zr | 8 |
| Cobalt octoate, 6% Co | 8 |
| Total | 1229 |

Adjust viscosity to about 100 Kreb units with additional mineral spirits. The resultant enamel has 81% solids content, dries to touch in about 4–6 hours, and through-dries in about 8–12 hours.

*Example 15*

The conjugated trans-isomerized safflower oils of this invention copolymerize with vinyl monomers, such as styrene and vinyl toluene, with extreme ease. The copolymers are extremely light-colored, viscous, fast drying vehicles usable in such products as quick-drying machinery enamels, maintenance enamels, and interior wall enamels. The hardness and dry can be varied by varying the rates of styrene or vinyl toluene to the treated oil. A typical copolymer is illustrated below. A mixture of treated safflower oils of G and Z-3 viscosity is preferably used, as the Z-3 body oil alone is so highly polymerized that it tends to form a gel when copolymerized.

| Ingredient: | Parts by weight |
|---|---|
| Safflower oil of Example 5, G viscosity | 100 |
| Safflower oil of Example 5, Z-3 viscosity | 100 |
| Mineral spirits | 300 |
| Vinyl toluene | 200 |
| Di-tertiary butyl peroxide | 2 |

The oil-mineral spirit solution is preferably heated under an inert gas blanket in a flask fitted with stirrer, thermometer, inert gas inlet tube and water cooled condenser. The temperature is held at about 330° F. while vinyl toluene catalyst mixture is dripped in through the condenser over a period of two hours. Then the mixture is brought to reflux temperatures (340–350° F.) and held under reflux for about 5 hours, cooled, and filtered. The resultant product has a Gardner-Holt viscosity (about 57% solids) of V and a Gardner Color of 1. This vehicle will set up to a solid, slightly tacky film in 20–30 minutes.

*Example 16*

Outside house paint has been developed from the improved treated conjugated, trans isomerized safflower oil of Z-3 viscosity (Example 5) which has the following advantages:

| | |
|---|---|
| Very rapid dry | It drys as rapidly as the long oil alkyd-type house paints. |
| Very light colors | The whites are brilliant and the tints are sharp and clear. |
| Low raw material cost per gallon | Superior film properties are obtained with less vehicle per gallon. |
| Non-Yellowing | There is no significant yellowing under eaves or in other areas of subdued light. |

The following formulations provide examples of easy brushing, non-sagging, good leveling, outside house paints. The fast, hard dry of these paints enables them to be formulated into excellent outside trim paints as well as main outside house paints.

| Ingredient | Parts by Weight | |
|---|---|---|
| | Zinc Type | Zinc Free Type |
| Zinc oxide | 140 | |
| Titanium dioxide, rutile | 105 | 200 |
| Titanium dioxide, anatase | 35 | 50 |
| Talc, fine | | 235 |
| Talc, medium | 260 | |
| Treated safflower oil, Z-3 viscosity (Example 5) | 300 | 330 |
| Bodied safflower oil Z-7 viscosity, acid No. 24 | 5 | 6 |
| Cobalt naphthenate, 6% Co | 2 | 3 |
| Lead naphthenate, 24% Pb | 8 | 9 |
| Anti-skinning agent | 0.5 | 0.5 |
| Mineral spirits | 295 | 270 |
| Phenyl mercuric oleate | | 10 |
| Totals | 1,150.5 | 1,113.5 |

Each of the above formulas may be ground on a three roll mill. Some of the mineral spirits are preferably withheld from the grind for the let-down. The amount of mineral spirits may vary from the amount shown above, depending on the desired working properties. They exhibit the following properties:

| Properties | Values | |
|---|---|---|
| | Zinc Type | Zinc Free Type |
| Pigment by volume concentration | 32% | 32.5%. |
| Viscosity, Kreb units | 80–90 | 80–90. |
| Gloss | Good | Excellent. |
| Dry to touch | 3–6 hours | 3–6 hours. |
| Through dry | 10–20 hours | 10–20 hours. |

We claim:

1. A process for conjugating and providing non-conjugated isolated trans double bonds in unsaturated drying oils having cis-type non-conjugated unsaturation, comprising
 heating the oil at atmospheric pressure at a temperature of from 475° F. to 550° F. while bubbling sulfur dioxide therethrough, and
 bleaching the resulting oil by replacing the sulfur dioxide with carbon dioxide while the oil is at a temperature between 300° F. and 550° F.

2. The process of claim 1 wherein the carbon dioxide treatment is between 400° F. and 550° F.

3. The process of claim 1 wherein the carbon dioxide treatment is continued until the vapors from the oil no longer turn blue an aqueous solution of 1% starch and 1% potassium iodate.

4. The process of claim 3 wherein said starch-potassium iodate solution comprises a moist piece of filter paper that had been immersed in an aqueous solution of 1% potassium iodate and 1% starch.

5. A drying oil having between 5% and 20% of conjugation and between 25% and 55% of non-conjugated isolated trans double bonds, resulting from the process of claim 1.

6. The process for imparting substantial diene conjugation to and providing non-conjugated isolated trans double bonds in unsaturated drying oils having cis-type non-conjugated unsaturation, comprising
 heating the oil at atmospheric pressure at a temperature of from 475° F. to 550° F. while bubbling sulfur dioxide therethrough,
 bleaching the resulting conjugated and trans isomerized oil by replacing the sulfur dioxide with carbon dioxide while the oil is at a temperature between 300° F. and 550° F., and
 then removing from said oil the sulfur dioxide and trace residual sulfones and sulfolenes by mixing with said oil material chosen from the group consisting of magnesium silicate, lime, clay produced from bentonites and sub-bentonites, and acid activated bleaching clay produced from bentonites and sub-bentonites, and then removing said material from said oil.

7. The process of claim 6 wherein said removal is accomplished by treating said oil with lime.

8. The process of claim 6 wherein said removal is accomplished by treating said oil with acid-activated bleaching clay produced from bentonite or sub-bentonites.

9. The process of claim 8 wherein said clay is a bentonite or sub-bentonite clay.

10. The process of claim 6 wherein the removal is accomplished by treating said oil with magnesium silicate.

11. The product resulting from the process of claim 6.

12. The product of claim 11 wherein the oil is safflower oil.

13. A process for conjugating and providing non-conjugated isolated trans double bonds in tri-glyceride drying oils rich in linoleic acid groups, comprising
   bubbling sulfur dioxide gas through the oil at 475° F. to 550° F. at atmospheric pressure, and
   bleaching the resulting product by replacing the sulfur dioxide with carbon dioxide while the oil is still at a temperature between 300° F. and 550° F.

14. A process for treating safflower oil, comprising heating it at atmospheric pressure and at 475° F. to 550° F. while bubbling sulfur dioxide therethrough to achieve 10% to 20% diene conjugation and 25% to 55% trans isomerization, and replacing the sulfur dioxide by carbon dioxide while the temperature is between 400° F. and 550° F.

15. A treated safflower oil having 10% to 20% diene conjugation and 25% to 55% trans isomers, resulting from the process of claim 14.

16. A process for treating walnut oil, comprising heating it at atmospheric pressure and at 475° F. to 550° F. while bubbling sulfur dioxide therethrough to achieve 5% to 20% diene conjugation and 25% to 55% trans isomerization, and then replacing the sulfur dioxide with carbon dioxide while the temperature is between 400° F. and 550° F.

17. The product resulting from the process of claim 16.

18. A process for treating linseed oil, comprising heating it at atmospheric pressure and at 475° F. to 550° F. while bubbling sulfur dioxide therethrough to achieve 5% to 20% diene conjugation and 25% to 55% trans isomerization, and then replacing the sulfur dioxide with carbon dioxide while the oil is still between 400° F. and 550° F.

19. The product resulting from the process of claim 18.

20. A process for treating soybean oil, comprising heating it at atmospheric pressure and at 475° F. to 550° F. while bubbling sulfur dioxide therethrough to achieve 5% to 20% diene conjugation and 25% to 55% trans isomerization, and then replacing the sulfur dioxide with carbon dioxide while the oil is still between 400° F. and 550° F.

21. The product resulting from the process of claim 20.

22. A process for treating sardine oil, comprising heating it at atmospheric pressure and at 475° F. to 550° F. while bubbling sulfur dioxide therethrough to achieve 5% to 20% diene conjugation and 25% to 55% trans isomerization, and then replacing the sulfur dioxide with carbon dioxide while the oil is still between 400° F. and 550° F.

23. The product resulting from the process of claim 22.

References Cited by the Examiner

UNITED STATES PATENTS

| | | | |
|---|---|---|---|
| 1,732,478 | 10/1929 | Kurath | 106—247 |
| 1,916,584 | 7/1933 | Pungs | 106—247 |
| 2,165,530 | 7/1939 | Bertram | 260—405.6 |
| 2,345,528 | 3/1944 | Bradley | 260—22 |
| 2,369,434 | 2/1945 | Church | 106—223 |
| 2,389,795 | 11/1945 | Luaces | 260—22 |
| 2,413,281 | 12/1946 | Auer | 106—223 |
| 2,418,454 | 4/1947 | Auer | 260—405.6 |
| 2,425,200 | 8/1947 | Nessler et al. | 260—405.6 X |
| 2,492,512 | 12/1949 | Zweig | 260—23 |
| 2,545,702 | 4/1951 | Norris | 260—23 |

FOREIGN PATENTS 480,677   7/1938   Great Britain.

CHARLES B. PARKER, *Primary Examiner.*

A. H. SUTTO, *Assistant Examiner.*